(12) United States Patent
Krueger et al.

(10) Patent No.: US 12,129,969 B2
(45) Date of Patent: Oct. 29, 2024

(54) APPARATUS, SYSTEM, AND METHOD FOR TEMPORARY LIQUID COMMODITY TRANSFER STATIONS

(71) Applicant: BNSF Railway Company, Fort Worth, TX (US)

(72) Inventors: Darrell Krueger, Lawrence, KS (US); Joshua Soles, Calgary (CA)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 17/412,674

(22) Filed: Aug. 26, 2021

(65) Prior Publication Data

US 2021/0387849 A1    Dec. 16, 2021

Related U.S. Application Data

(63) Continuation-in-part of application No. 15/665,904, filed on Aug. 1, 2017.

(51) Int. Cl.
*F17C 13/08* (2006.01)
*B67D 7/04* (2010.01)
(Continued)

(52) U.S. Cl.
CPC .............. *F17C 13/083* (2013.01); *B67D 7/04* (2013.01); *B67D 7/36* (2013.01); *B67D 7/62* (2013.01);
(Continued)

(58) Field of Classification Search
CPC ........ F17C 9/00; F17C 9/02; F17C 2221/032; F17C 2221/033; F17C 2221/035;
(Continued)

(56) References Cited

U.S. PATENT DOCUMENTS 3,229,472 A * 1/1966 Beers .................. F17C 9/02
62/50.3
3,341,215 A * 9/1967 Spector ............... F17C 13/086
220/592.27

(Continued)

*Primary Examiner* — Christopher R Zerphey
(74) *Attorney, Agent, or Firm* — Whitaker Chalk Swindle & Schwartz PLLC; Enrique Sanchez, Jr.; Bradley J. Birchfield

(57) ABSTRACT

An apparatus, system, and method for temporary fluid commodity transfer stations. A fluid commodity transfer structure can include a base member, a casing, and a fluid commodity transfer system. The fluid commodity transfer system can be configured to dispense a commodity for transloading from opposite sides of the fluid commodity transfer structure. A modular fueling station system can include one or more receptacles operably coupled to a fluid commodity transfer structure to allow a fluid commodity transfer system to utilize each receptacle as a fuel reservoir. The fluid commodity transfer structure can be loaded onto an intermodal transport vehicle, unloaded at a location, deposited at the location, and be operably coupled with one or more receptacles and/or other fluid commodity transfer structures to provide fueling infrastructure for fleet vehicles or allow for the commercial transfer of fluid from one receptable to another as a mobile fluid transfer system.

26 Claims, 11 Drawing Sheets

(51) Int. Cl.
  *B67D 7/36* (2010.01)
  *B67D 7/62* (2010.01)
  *B67D 7/84* (2010.01)
  *F17C 6/00* (2006.01)
  *F17C 9/00* (2006.01)

(52) U.S. Cl.
  CPC ............... *B67D 7/845* (2013.01); *F17C 6/00* (2013.01); *F17C 9/00* (2013.01); *F17C 2201/0104* (2013.01); *F17C 2201/0119* (2013.01); *F17C 2201/035* (2013.01); *F17C 2201/054* (2013.01); *F17C 2205/0107* (2013.01); *F17C 2205/0126* (2013.01); *F17C 2205/0157* (2013.01); *F17C 2205/0323* (2013.01); *F17C 2221/012* (2013.01); *F17C 2221/013* (2013.01); *F17C 2221/033* (2013.01); *F17C 2221/035* (2013.01); *F17C 2223/0123* (2013.01); *F17C 2223/0153* (2013.01); *F17C 2223/0161* (2013.01); *F17C 2223/033* (2013.01); *F17C 2223/035* (2013.01); *F17C 2225/0161* (2013.01); *F17C 2225/033* (2013.01); *F17C 2225/044* (2013.01); *F17C 2227/0341* (2013.01); *F17C 2265/065* (2013.01); *F17C 2270/0168* (2013.01); *F17C 2270/0173* (2013.01); *Y02E 60/32* (2013.01)

(58) Field of Classification Search
  CPC .......... F17C 2225/0123; F17C 2270/01; F17C 2270/0165; F17C 5/02; F17C 5/06; F17C 13/08; F17C 13/083; F17C 2250/061; F17C 2250/075; F17C 2227/047; B61D 5/004; B61D 5/04; B61D 5/06; B67D 7/845; B67D 7/04; B67D 7/36; B67D 7/62
  USPC .................................................. 141/231, 232
  See application file for complete search history.

(56) References Cited

U.S. PATENT DOCUMENTS

| | | | | |
|---|---|---|---|---|
| 3,727,651 | A | * | 4/1973 | Biever .................. F17C 9/02 141/82 |
| 4,098,426 | A | | 7/1978 | Gerhard |
| 4,422,485 | A | * | 12/1983 | O'Shea .................. B67D 7/00 105/241.1 |
| 4,960,222 | A | | 10/1990 | Fields, III |
| 5,107,772 | A | | 4/1992 | Viens |
| 5,114,046 | A | * | 5/1992 | Bryant .................. B60S 5/02 222/173 |
| 5,360,139 | A | | 11/1994 | Goode |
| 5,386,845 | A | | 2/1995 | Zink |
| 5,682,750 | A | | 11/1997 | Preston et al. |
| 5,711,456 | A | | 1/1998 | Bryant |
| 5,752,617 | A | | 5/1998 | Yung |
| 5,878,767 | A | * | 3/1999 | Etling .................. F17C 9/00 137/15.01 |
| 5,884,709 | A | | 3/1999 | Evans et al. |
| 5,954,101 | A | | 9/1999 | Drube et al. |
| 8,393,860 | B2 | * | 3/2013 | Czechowski .......... F04D 17/12 415/176 |
| 8,925,470 | B2 | | 1/2015 | Hart |
| 2002/0079016 | A1 | | 7/2002 | Webb |
| 2004/0250871 | A1 | * | 12/2004 | Bingham .................. F17C 7/02 141/59 |
| 2006/0156742 | A1 | | 7/2006 | Farese et al. |
| 2010/0320727 | A1 | | 12/2010 | Haut et al. |
| 2014/0202583 | A1 | | 7/2014 | Lee et al. |
| 2014/0299101 | A1 | * | 10/2014 | Melanson .......... F02M 21/0221 123/445 |
| 2015/0136043 | A1 | | 5/2015 | Shaaban et al. |
| 2015/0303770 | A1 | * | 10/2015 | Beissler ................ H02K 7/1815 290/1 A |
| 2015/0338858 | A1 | | 11/2015 | Bates et al. |
| 2016/0195221 | A1 | | 7/2016 | Roberts |
| 2017/0023180 | A1 | | 1/2017 | Petit et al. |
| 2018/0079347 | A1 | * | 3/2018 | Ellis .................. B60P 1/6454 |

* cited by examiner

APPARATUS, SYSTEM, AND METHOD FOR TEMPORARY LIQUID COMMODITY TRANSFER STATIONS

CROSS-REFERENCE TO RELATED APPLICATIONS

The present application is a Continuation-in-Part of U.S. patent application Ser. No. 15/665,904, filed Aug. 1, 2017, the entirety of which is herein incorporated by reference.

TECHNICAL FIELD

The present disclosure can relate generally to apparatuses, systems, and methods establishing temporary liquid commodity transfer stations. In particular, the present disclosure can include a fluid commodity transfer structure configured to be mobilized and deposited at a desired location and subsequently facilitate the dispensing of a fuel and/or fluid, such as to a vehicle or vehicles, or from vehicles to railcars to permit transloading of commodities.

BACKGROUND

Across the world, transportation networks are ubiquitously essential, as are the constituents of those networks. Every transportation network, whether transporting goods or people, utilizes fleets of vehicles that travel via ground, air, and/or sea, and thoroughfares for these vehicles crisscross our geography, airspace, and waterways. These fleet vehicles, regardless of their travel medium, all require one thing: fuel. Some fleet vehicles, such as trucks, can travel on common roadways and benefit from existing fueling infrastructure, such as fueling stations for automobiles. Other fleet vehicles (e.g., trains, planes, ships, etc.) can have their own dedicated fueling stations at strategic locations. Generally, fueling stations are permanent establishments, consisting of buried fuel tanks, fixed fuel pumps, and edifices to provide a place for transactions between consumption vehicles and station personnel.

However, it is often required that fleet vehicles navigate to remote areas far removed from existing infrastructure. For example, trucks may have to travel back and forth from a well pad for oil and gas applications, adding to logistical issues. Similarly, trains are dispersed over sparse mountain passes and through miles of uninhabited desert landscape to enable transportation of goods and/or people all over the world. Depending on a job to be accomplished or a destination location, a multitude of fleet vehicles may be in constant flow around a given area that has no fueling infrastructure in place. Further, such an area may only be transiently busy, such as with respect to a project that has an end date, meaning that investment into permanent fueling infrastructure is not economically reasonable.

However, due to the number of vehicles and/or sheer magnitude of fuel that can be required by a single vehicle (e.g., a fuel tank on a locomotive), providing sufficient fuel and necessary dispensing capabilities for a given location is often extremely arduous, if not impossible. Fuel trucks can generally bring only one tank of fuel at a time, the entirety of which can be consumed by a single locomotive. Additionally, pumps must separately be transported, installed, and exchanged from fuel tank to fuel tank, each pump often unable to utilize more than one fuel tank at a time as a fuel reservoir. Even on-site fuel tanks with significant volumes that can be filled via fuel trucks offer significant issues, such as the risk of spillage during transfer of fuel to the tank, and the cumbersome nature of the tanks themselves. There is also a lack of harmony between these makeshift fueling solutions that causes barriers to efficiency and productivity. For example, a given fuel truck generally cannot unload its payload, such as to transport fuel to another location along the train tracks, because the truck's freight is often integrated with the truck itself. As another example, to facilitate fueling at another location, pumps must be disconnected and packed away to ensure their safety in transport, tanks must be sealed and removed (generally by a vehicle-specific method, such as a trailer pulled by a truck)—entire infrastructures must be completely broken down to enable fueling even a short way down a thoroughfare from the current location.

Some commercial fuel producers may see a need to transload commodities from truck to rail car to facilitate longer distance transportation, or to accommodate production facilities which may not have existing rail access. Truck to rail transload components can be costly and face challenging regulations around fixed infrastructure. Furthermore, some emerging commodities, such as Liquefied Natural Gas or Hydrogen, may not have readily available commercial transfer systems in place, adding to the difficult economics of moving these products by rail.

SUMMARY

The present disclosure can include a fluid commodity transfer structure that can provide several advantages. For example, the fluid commodity transfer structure can have a fluid commodity transfer system protected by a casing proximate an intermodal footprint on the fluid commodity transfer structure, such that a receptacle corresponding to the intermodal footprint can be removably disposed thereon and be coupled to the fluid commodity transfer system, such as in the Liquid Natural Gas fueling, or commercial custody transfer of Liquid Carbon Dioxide and hydrogen, among others. In one embodiment, the receptacle can be replaced with a different receptacle, such as if the first receptacle runs out of fluid. In another embodiment, the fluid commodity transfer structure can provide an integrated, mobile fluid commodity transfer station that can be unloaded and reloaded without requiring detachment of, e.g., the fluid commodity transfer system from the receptacle on the base member of the fluid commodity transfer structure. For example, a fluid commodity transfer structure in accordance with the principle of the present disclosure can include an intermodal footprint on a bottom side of a base of the fluid commodity transfer structure—in one embodiment, such intermodal footprint can facilitate the removable disposal and/or mounting of the fluid commodity transfer structure on an intermodal transport vehicle and/or any other surface suitable to support the fluid commodity transfer structure. For example, a receptacle can be any object or space used to hold something, such as a storage bullet, isocontainer, or other suitable container or void.

In another embodiment, the present disclosure can include a mobile transload station capable of dispensing a liquid commodity from two opposite sides of the station. For example, the mobile transload station can include a fluid commodity transfer structure with a fluid commodity transfer system with outlets on either side, such that the fluid commodity transfer structure can dispense liquid or fuel to locations on either side of the fluid commodity transfer structure, thereby allowing fluid commodity transfer of two separate modes of transportation concurrently. Additionally, the fluid commodity transfer system can facilitate the transfer of a commodity between a road vehicle and a railcar. For example, the fluid commodity transfer structure can be placed proximate a railway, a roadway, a waterway, or other suitable transportation medium to allow commodity transfer between different modes of transportation. In another embodiment, the mobile fluid commodity transfer station can include an intermodal transport vehicle with a fluid commodity transfer structure removably disposed thereon. Advantageously, where a fluid commodity transfer station can be disposed between, e.g., two railroad tracks, and liquid commodity (e.g. fuel, Liquid Carbon Dioxide, and hydrogen, etc.) can be dispensed to two separate fluid commodity tenders on the tracks to form the same fueling station. In another embodiment, a fluid commodity transfer station can include a boom. A boom can be advantageous in providing ergonomic benefits, as well as allowing for the use of less hose. Having a temporary fluid commodity transfer system to test market demand and the economics of transporting such products by rail would be highly beneficial. The temporary fluid commodity transfer system can receive a commodity by truck and dispense to rail or by rail and dispense to truck.

In one embodiment, the present disclosure can include a fluid commodity transfer structure comprising: a base member having a top side and a bottom side; a casing coupled to the top side of the base member; and a fluid commodity transfer system disposed on the top side of the base member within the casing, the fluid commodity transfer system having at least one pump, at least one valve actuator, and at least one outlet, wherein the top side of the base member is configured to receive at least one receptacle. In another embodiment, the top side of the base member can include a first intermodal footprint. In another embodiment, the casing and the fluid commodity transfer system can be proximate the first intermodal footprint. In another embodiment, the first intermodal footprint of the base member can be capable of receiving the at least one receptacle. In another embodiment, the bottom side of the base member can include a second intermodal footprint. In another embodiment, the second intermodal footprint can be configured to facilitate placement of the fluid commodity transfer structure on an intermodal transport vehicle. In another embodiment, the base member can be daisy-chained with a plurality of intermodal footprints. In another embodiment, the fluid commodity transfer system can include a first side and a second side, wherein each of the first and second sides can include at least one outlet. In another embodiment, the fluid commodity transfer structure can further include a first receptacle removably disposed on the top side of the base member and operably coupled to the fluid commodity transfer system. In another embodiment, the fluid commodity transfer structure can further include a conduit configured to operably couple the fluid commodity transfer system to at least one receptacle. In another embodiment, the conduit can be removably coupled to the base member. In another embodiment, the first receptacle can include a tank and a frame. In another embodiment, the fluid commodity transfer structure can further include a boom operably coupled to the fluid commodity transfer structure and configured to dispense a fuel from at least one receptacle.

In another embodiment, the present disclosure can include a method of establishing a temporary fluid commodity transfer station, the method comprising the steps of: transporting, via a vehicle, a fluid commodity transfer structure to a location, the fluid commodity transfer structure including a base member, a casing coupled to a top side of the base member, a fluid commodity transfer system disposed within the casing, and a first receptacle disposed on the top side of the base member proximate the casing and fluid commodity transfer system; depositing the fluid commodity transfer structure at the location; coupling at least one other receptacle to the fluid commodity transfer structure via a conduit; and dispensing, via the fluid commodity transfer system, a fluid from at least one of the first receptacle or the at least one other receptacle. In another embodiment, the location can be proximate a railroad track. In another embodiment, the fluid can be dispensed to a tender of a train. In another embodiment, the location can be between two railroad tracks. In another embodiment, the fluid commodity transfer structure can include a first side, and a first outlet of the fluid commodity transfer system can be configured to dispense the fluid proximate the first side of the fluid commodity transfer structure. In another embodiment, the fluid commodity transfer structure can include a second side, and a second outlet of the fluid commodity transfer system can be configured to dispense the fluid proximate the second side of the fluid commodity transfer structure. In another embodiment, the method can further include the step of unloading the fluid commodity transfer structure from the vehicle. In another embodiment, the fluid commodity transfer structure can be removably coupled to a rail car. Wherein the fluid commodity can be dispensed into a rail car for transportation.

In another embodiment, the present disclosure can include a modular fluid commodity transfer station system, the system comprising: a first fluid commodity transfer structure including: a base member having a top side and a bottom side; and a fluid commodity transfer system disposed on the top side of the base member, the fluid commodity transfer system having at least one pump, at least one valve actuator, and at least one outlet; a first receptacle removably disposed on the top side of the base member and operably coupled to the fluid commodity transfer system; and a second receptacle. In another embodiment, the system can further include a third receptacle. In another embodiment, the system can further include a second fluid commodity transfer structure. In another embodiment, the second receptacle can be removably disposed on the second fluid commodity transfer structure. In another embodiment, the second receptacle can be operably coupled to a fluid commodity transfer system of the second fluid commodity transfer structure. In another embodiment, the second receptacle can be operably coupled to the fluid commodity transfer system of the first fluid commodity transfer structure. In another embodiment, the third receptacle can be operably coupled to the fluid commodity transfer system of the first fluid commodity transfer structure. In another embodiment, the first fluid commodity transfer structure can further include a casing coupled to the top side of the base member. In another embodiment, the fluid commodity transfer system can be disposed within the casing. In another embodiment, the bottom side of the first fluid commodity transfer structure can include an intermodal footprint. Wherein the modular fluid commodity transfer system facilitates the transfer of a commodity between a road vehicle and a railcar. Wherein the structure is placed proximate a railway and a roadway to allow commodity transfer between different modes of transportation.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1:
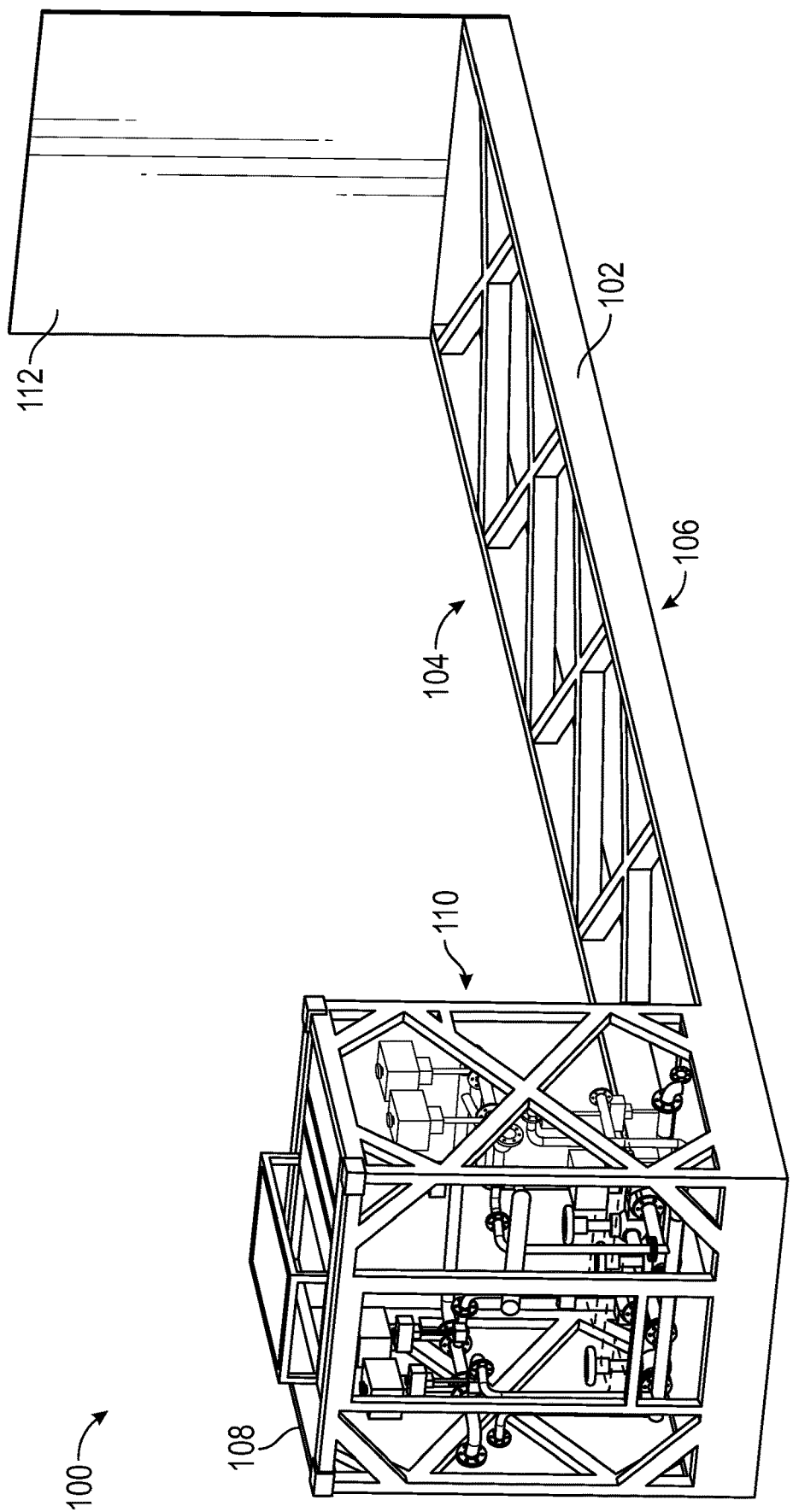
FIG. 1 illustrates a perspective view of an exemplary fluid commodity transfer structure, in accordance with one or more exemplary embodiments of the present disclosure.

FIG. 1 illustrates a perspective view of a fluid commodity transfer structure 100 in accordance with the principles of the present disclosure. In one embodiment, the fluid commodity transfer structure 100 can include a base member 102. For example, the fluid commodity transfer structure 100 can take the form of a platform, skid, stage, or any other structure. In another example, the fluid commodity transfer structure 100 can include a top side 104 and a bottom side 106. For example, the top side 104 can be a surface and, in one embodiment, the top side 104 can be configured to receive at least one receptacle (e.g., such as receptacle 200 in FIG. 2). In another example, the bottom side 106 can be a surface and, in one embodiment, be configured to support, e.g., at least one receptacle. In another example, the bottom side 106 can be configured to rest on another surface, e.g., the ground, a trailer, a rail car, or any other surface suitable to support the fluid commodity transfer structure 100. In another embodiment, the fluid commodity transfer structure 100 can include a barrier member 112. For example, a barrier member 112 can be coupled to the base member 102 distal the casing 108. In another example, the barrier member 112 can be configured to abut a receptacle disposed on the top side 104 of the base member 102, such as to facilitate the securing of a receptacle thereon. In another example, the barrier member 112 can be a plate, ledge, protrusion, platform, or any other design or configuration suitable to abut a receptacle disposed on the top side 104 of the base member 102.

In one embodiment, the top side 104 of the base member 102 can include a first intermodal footprint. In one example, an intermodal footprint can be a surface configured to receive an intermodal structure. For example, an intermodal structure can include a container, a receptacle (e.g., like receptacle 200 in FIG. 2), a skid, a vehicle, a trailer, a pallet, or any other structure suitable for being transported. "Intermodal transport" can involve transportation of a freight (e.g., an intermodal structure, a vehicle, etc.) using one or more modes of transportation (e.g., rail, ship, truck, etc.). In one embodiment, intermodal transport can involve exchanging a freight from one mode of transport to another without handling the freight itself. For example, intermodal transport of a fluid within a receptacle can involve moving a receptacle and contained fluid from a first transport mode (e.g., a truck) to a second transport mode (e.g., a train), as opposed to, e.g., pumping the fluid from a receptacle on a truck to a separate receptacle on a train. In another example, an intermodal footprint can be a surface having a standard length (e.g., 20 feet, 40 feet, 45 feet, 48 feet, 53 feet), or any other length. In another example, an intermodal footprint can include latches, corrugation, coupling mechanisms, indentions, ledges, imprints, beveling, shaping, or any other element or elements suitable to facilitate the receiving by and/or mounting of an intermodal transport constituent (e.g., any constituent participating in intermodal transport, such as vehicles, storage containers, pallets, etc.) and/or intermodal transport vehicles, such as, for example, trains, trucks, trailers, aircrafts, ships, rail cars, etc.

In another embodiment, the top side 104 can include a first intermodal footprint that can be configured to receive a receptacle. In one example, the top side 104 can be configured, via a first intermodal footprint, to receive a receptacle. For example, top side 104 can be include a first intermodal footprint that has a length and width similar to that of a receptacle. In another example, the top side 104 can include any sizing, shaping, or other design that can facilitate the receiving of a receptacle thereon. In another embodiment, the bottom side 106 can include a second intermodal footprint. For example, the bottom side 106 can have a length and width similar to that of an intermodal transport vehicle, e.g. a rail car, trailer, ship, etc. In another example, the bottom side 106 can include any sizing, shaping, or other design that can facilitate the mounting and/or removable mounting of the fluid commodity transfer structure 100 to an intermodal transport constituent. In another example, the bottom side 106 can be operable to support the fluid commodity transfer structure 100, such as on a substantially flat surface (e.g., the ground and/or a rail car); in another example, the bottom side 106 can be convex, concave, or any other shape.

In another embodiment, the fluid commodity transfer structure 100 can include a casing 108. For example, the casing 108 can be a shell, frame, box, enclosure, or any other element suitable to border a component. In another example, the casing 108 can be coupled to the top side 104 of the base member 102. In another example, the casing 108 can be coupled to the top side 104 of the base member 102 proximate a first intermodal footprint on the top side 104 of the base member 102. In another embodiment, the fluid commodity transfer structure 100 can include a fluid commodity transfer system 110 couped to the top side 104 of the base member 102. In one example, the fluid commodity transfer system 110 can be within the casing 108. In another example, the casing 108 can provide protection for the fluid commodity transfer system 110. In another example, the fluid commodity transfer system 110 can be proximate a first intermodal footprint. In another example, the fluid commodity transfer system 110 can be configured to be removably coupled to a receptacle (such as receptacle 200 in FIG. 2). In another example, the fluid commodity transfer system 110 can be configured to be coupled with any receptacle, such as to facilitate the dispensing of a fluid from a receptacle. In another embodiment, the fluid commodity transfer structure 100 can be considered to include a receptacle (such as, e.g., receptacle 200 of FIG. 2).

In another embodiment, the fluid commodity transfer structure 100 can include a generator and/or an air compressor. For example, the base member 102 can include an air compressor and/or a generator on the top side 104 of the base member 102. In another example, the base member 102 can be extended (e.g., beyond the casing 108 and/or the barrier member 112) such that the base member can accommodate and air pump and/or a generator. In another embodiment, the fluid commodity transfer structure 100 can include an area for storage. For example, the base member 102 can include a space for storage on the top side 104 of the base member 102. In another example, the base member 102 can be extended (e.g., beyond the casing 108 and/or the barrier member 112) such that the base member 102 can accommodate an area for storage. In another example, a storage area can be covered by a housing, casing, and/or any other type of suitable coverage.

Figure 2:
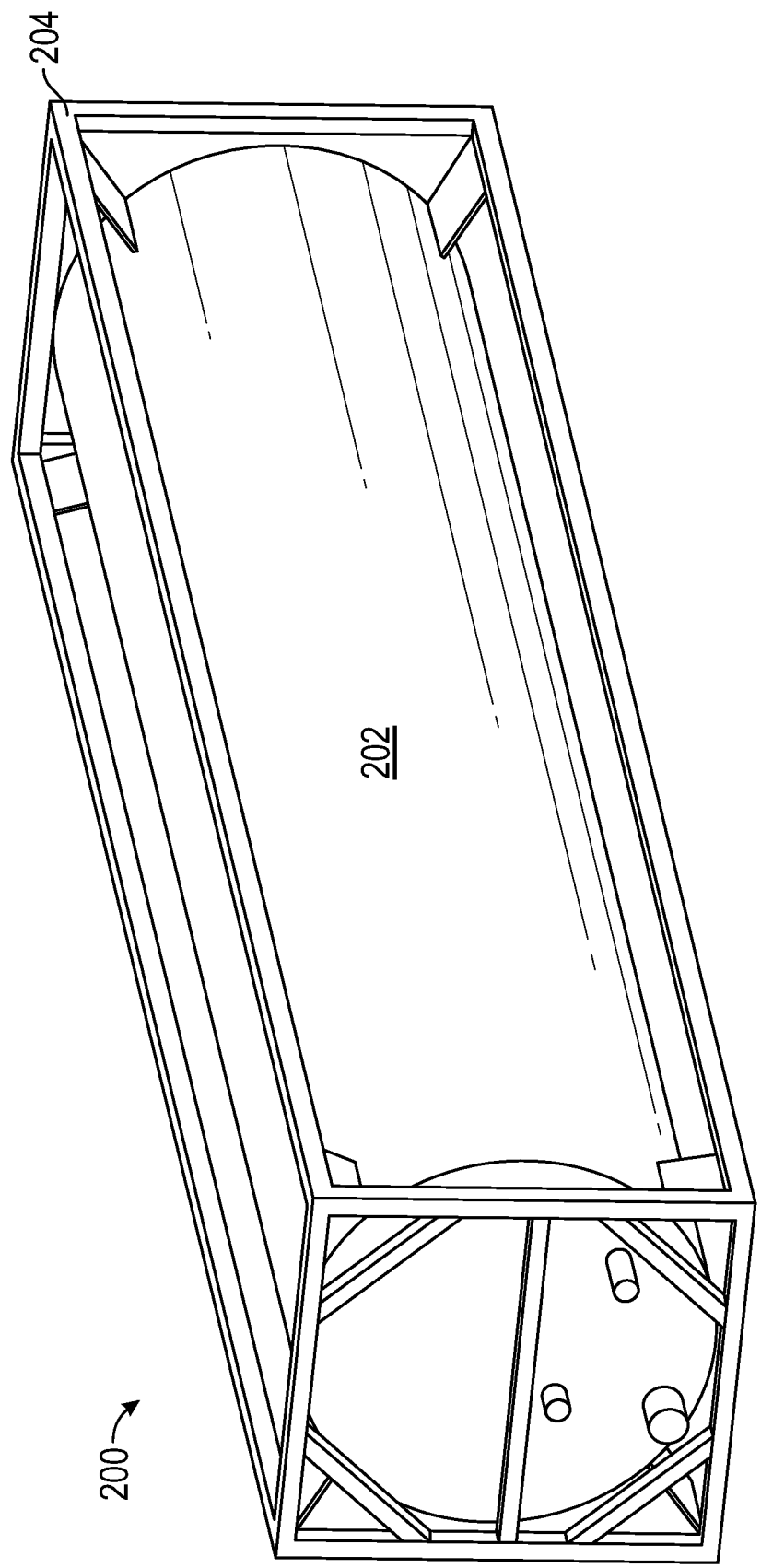
FIG. 2 illustrates a perspective view of an exemplary receptacle, in accordance with one or more exemplary embodiments of the present disclosure.

FIG. 2 depicts an exemplary receptacle 200 in accordance with the principles of the present disclosure. In one embodiment, a receptacle 200 can include a tank 202. For example, the tank 202 can be a storage tank, a fluid tank, or any other container configured to hold any sort of liquid, solid, or other freight. In another embedment, the receptacle 200 can include a frame 204. For example, the frame 204 can be coupled to the tank 202. In another example, the tank 202 can be within and/or supported by the frame 204. In another embodiment, the tank 202, the frame 204, or both can be configured to mount in and/or to an intermodal footprint. For example, the receptacle 200 can be configured to mount to the first intermodal footprint on the top side 104 of the fluid commodity transfer structure 100 of FIG. 1. In one embodiment, the receptacle 200 can be configured to hold a fluid. For example, a fluid can can include gasoline, diesel, liquid natural gas, natural gas, liquid carbon dioxide, water, organic solvent, inorganic solvent, feed, grain, ethanol, coal, or any other liquid. In another embodiment, the receptacle 200 can be a shipping container, cube, box, drum, fuel tank, cryogenic tank, water tank, bladder, pallet, or any other structure suitable to contain an object.

Figure 3:
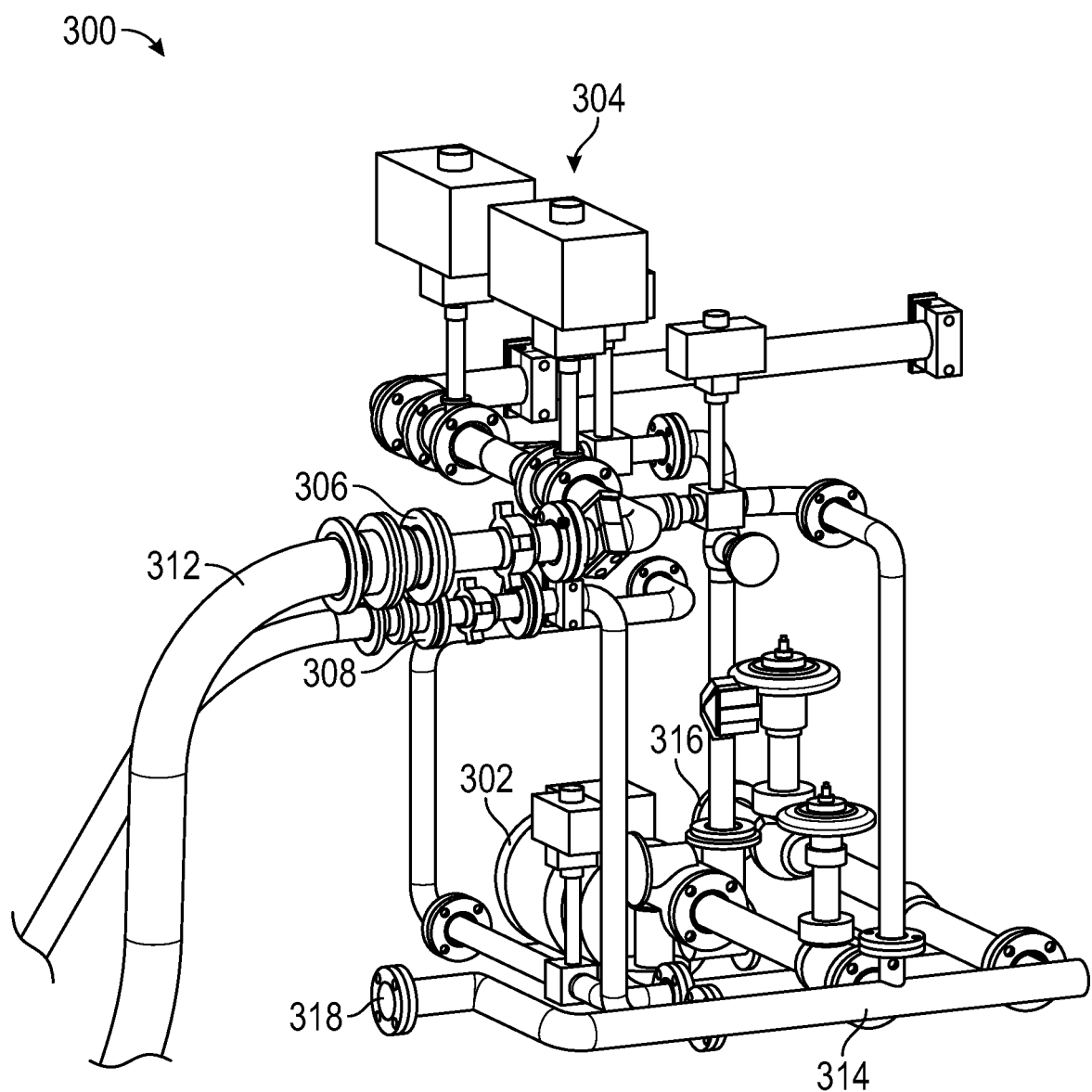
FIG. 3 illustrates an exemplary fluid commodity transfer system, in accordance with one or more exemplary embodiments of the present disclosure.

FIG. 3 illustrates an exemplary fluid commodity transfer system 300 in accordance with the principles of the present disclosure. In one embodiment, as understood by a person of ordinary skill in the art, the fluid commodity transfer system 300 can include at least one pump 302. For example, the pump 302 can be capable for facilitating the dispensing of a liquid from a receptacle through one or more outlets 306, 308. In another embodiment, as understood by a person of ordinary skill in the art, the fluid commodity transfer system 300 can include at least one valve actuator 304. For example, the valve actuator 304 can be capable of facilitating control of fluid commodity dispensing from one or more outlet 306, 308. In another embodiment, the fluid commodity transfer system 300 can include one or more outlets 306, 308. For example, the outlets 306, 308 can be capable of dispensing fluid retrieved via the pump 302. In another example, the outlets 306, 308 can be configured to couple to a dispensing apparatus, such as a hose 312, that mediate fluid dispensing from the system 300 to another location. For example, the outlets 306, 308 can have threads, quick-connects, or any other suitable mechanism to facilitate attachment of a dispensing apparatus. In another embodiment, the fluid commodity transfer system 300 can include a manifold 314. In one embodiment, the manifold 314 can be configured to receive and/or transport fluid from and/or to a number of locations. For example, the manifold 314 can have a first inlet 316 configured to receive fluid and transport the fluid to one or both of the outlets 306, 308. In another example, the manifold 314 can include a second inlet 318 configured to receive a fluid and transport the fluid to one or both of the outlets 306, 308. In another embodiment, the manifold 314 can be coupled with any number of inlets and/or outlets to facilitate the transportation of fluid within and/or via the fluid commodity transfer system 300.

Figure 4:
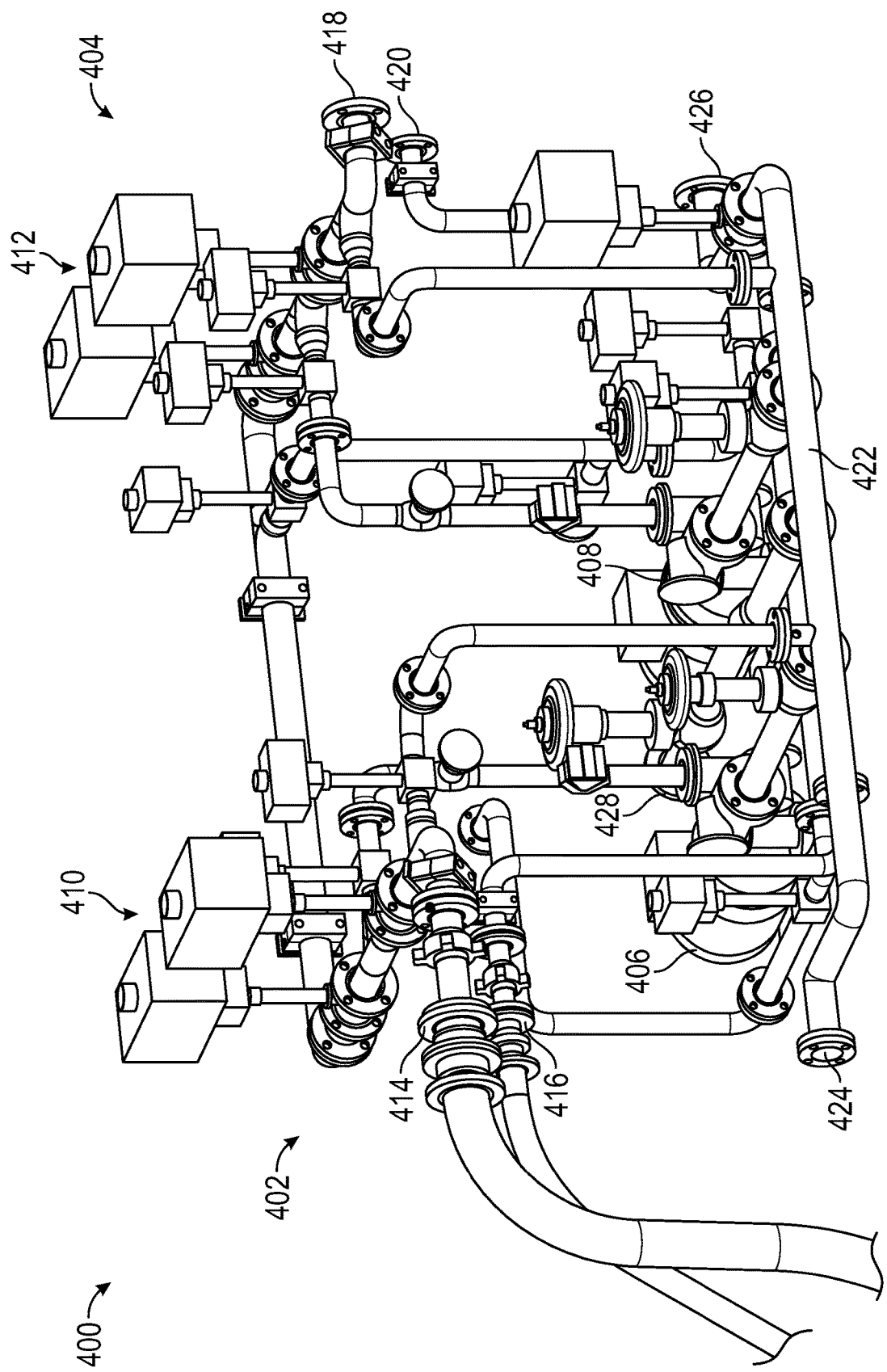
FIG. 4 an exemplary fluid dispensing system (fluid commodity transfer system), in accordance with one or more exemplary embodiments of the present disclosure.

FIG. 4 depicts an exemplary fluid dispensing system (fluid commodity transfer system) 400 in accordance with the principles of the present disclosure. In one embodiment, the fluid commodity transfer system 400 can be configured to dispense fluid at one or more orientations. For example, the fluid commodity transfer system 400 can include a first side 402 and a second side 404. For example, the first and second sides 402, 404 of the fluid commodity transfer system 400 can each be configured to dispense fluid. In another example, each of the first side 402 and the second side 404 can include components to facilitate the dispensing of fluid from their respective areas. For example, the first side 402 can include at least one pump 406, at least one valve actuator 410, and one or more outlets 414, 416. In one example, such components can facilitate the dispensing of fluid from the first side 402. In another example, the second side 404 can include at least one pump 408, at least one valve actuator 412, and one or more outlets 418, 420. In another example, such components can facilitate the dispensing of fluid from the second side 404. In another embodiment, the fluid commodity transfer system 400 can include a manifold 422 operably coupled to one or both of the first and second sides 402, 404 of the fluid commodity transfer system 400. In one example, the manifold 422 can include one or more inlets 424, 426; for example, a first inlet 424 can be located on the first side 402 of the fluid commodity transfer system 400, and a second inlet 426 can be located on the second side 404 of the fluid commodity transfer system 400. In another embodiment, the fluid commodity transfer system 400 can include a third inlet 428.

In one embodiment, the fluid commodity transfer system 400 can facilitate the dispensing of fluid from two separate sides of the fluid commodity transfer system 400. For example, the fluid commodity transfer system 400 can be mounted to a base member of a fluid commodity transfer structure (such as, e.g., base member 102 of fluid commodity transfer structure 100 depicted in FIG. 1), and the fluid commodity transfer system 400 can dispense fluid from both sides thereof. In another embodiment, the fluid commodity transfer system 400 can be configured to operably coupled to one or more reservoirs via, e.g., inlets 424, 426, 428. For example, the fluid commodity transfer system 400 can be oriented on a top surface of a base member such that inlet 428 can be facing towards a receptacle, such as a receptacle that can be disposed on an intermodal footprint of the top surface of the base member. In another example, the fluid commodity transfer system 400 can be coupled to a top surface of a base member such that the first and second sides 402, 404 can each face outwards towards different sides of a fluid commodity transfer structure (e.g., fluid commodity transfer structure 100 depicted in FIG. 1). In one example, such orientation can enable the fluid commodity transfer system 400 to, e.g., couple to one or more reservoirs located on either side of the fluid commodity transfer system 400 via the inlets 424, 426. For example, the inlets 424, 426, 428 can direct fluid to the manifold 422, which can then direct fluid amongst the system 400. In another example, such orientation can enable the fluid commodity transfer system 400 to dispense fluid at different sides of the fluid commodity transfer system 400. For example, the fluid commodity transfer system 400 can be configured and/or oriented such that fluid can be dispense from outlets 414, 416 and/or from outlets 418, 420.

In one embodiment, fluid commodity transfer systems in accordance with the principles of the present disclosure (e.g. fluid commodity transfer system 400) can be configured for different types of fluids. For example, a fluid commodity transfer system can be configured for liquid natural gas, diesel, gasoline, ethanol, water, or any other fluid. In another example, a side of a fluid commodity transfer system (e.g., first side 402 and/or second side 404) can be configured for a particular fluid. In another example, sides of a fluid commodity transfer system in accordance with principles of the present disclosure can each be configured for different types of fluid. For example, first side 402 can be configured for diesel, and second side 404 can be configured for liquid natural gas.

Figure 5:
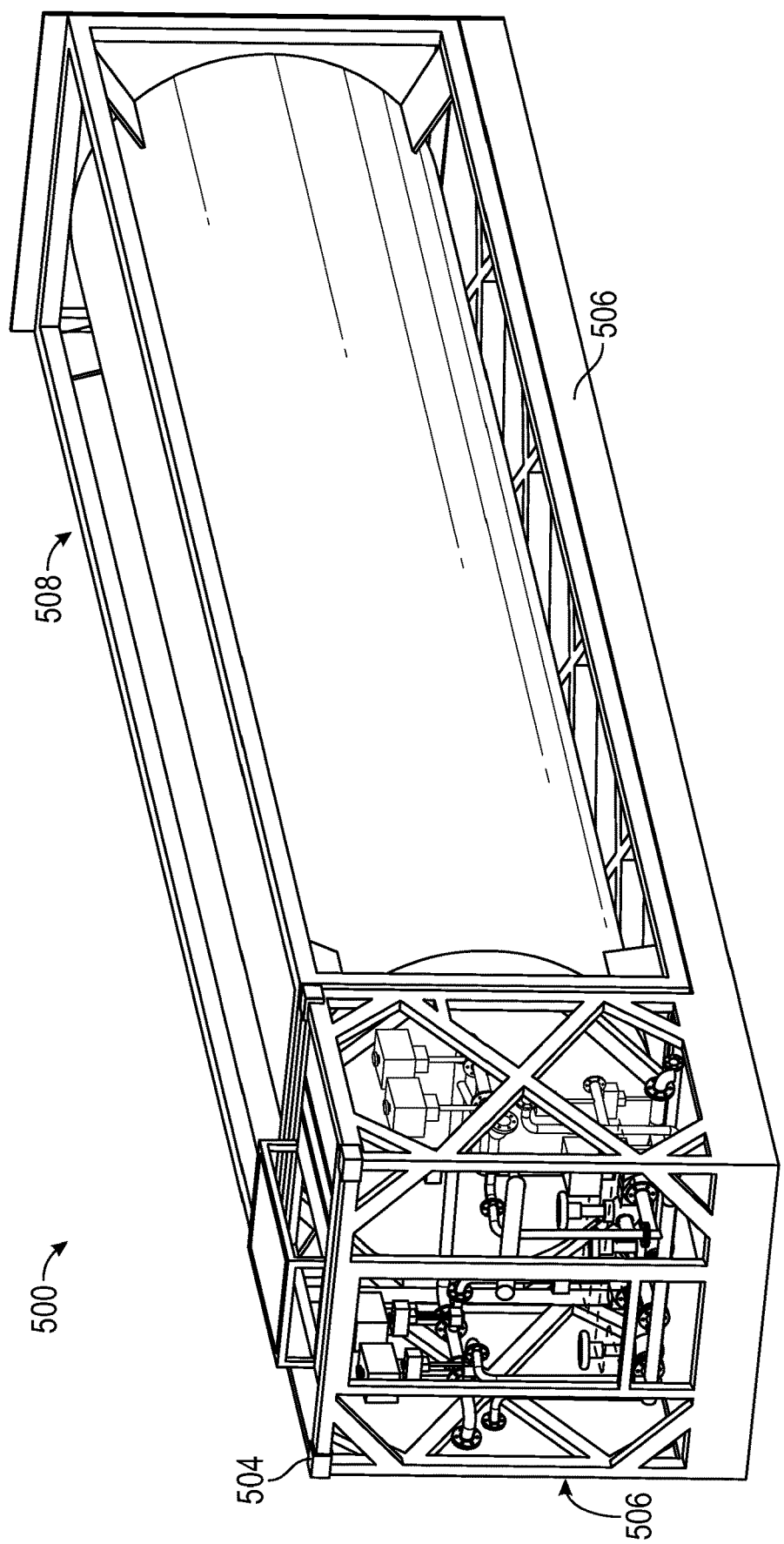
FIG. 5 illustrates an exemplary fluid delivery structure (fluid commodity transfer structure), in accordance with one or more exemplary embodiments of the present disclosure.

FIG. 5 illustrates an exemplary fluid delivery structure (fluid commodity transfer structure) 500 in accordance with the principles of the present disclosure. In one embodiment, the fluid commodity transfer structure 500 can include a base member 502. For example, the fluid commodity transfer structure 500 can include a top side and a bottom side in accordance with the principles of the present disclosure. For example, the top side can be a surface and, in one embodiment, the base member 502 can be configured to receive at least one receptacle 508. In another example, the bottom side of the base member 502 can be a surface and, in one embodiment, be configured to support, e.g., at least one receptacle 508. In another example, the bottom side of the base member 502 can be configured to rest on another surface, e.g., the ground, a trailer, a rail car, or any other surface suitable to support the fluid commodity transfer structure 500. In another embodiment, and in accordance with the principles of the present disclosure, the top side of the base member 502 can include a first intermodal footprint that can be configured to receive a receptacle 508. In another embodiment, the bottom side of the base member 502 can include a second intermodal footprint in accordance with the principles of the present disclosure. In one example, the first and second intermodal footprints can be different. In another example, the first and second intermodal footprints can be the same.

In another embodiment, the fluid commodity transfer structure 500 can include a casing 504 in accordance with the principles of the present disclosure. For example, the casing 504 can be a shell, frame, box, enclosure, or any other element suitable to encase a component. In another example, the casing 504 can be coupled to the top side of the base member 502. In another example, the casing 504 can be coupled to the top side of the base member 502 proximate a first intermodal footprint on the top side of the base member 502. In another embodiment, the fluid commodity transfer structure 500 can include a fluid commodity transfer system 506 in accordance with the principles of the present disclosure. In one example, the fluid commodity transfer system 506 can be coupled to the top side of the base member 502. In one example, the fluid commodity transfer system 506 can be within the casing 504. In another example, the casing 504 can provide protection for the fluid commodity transfer system 506. In another example, the fluid commodity transfer system 506 can be proximate a first intermodal footprint. In another example, the fluid commodity transfer system 506 can be configured to be removably coupled to a receptacle 508. In another example, the fluid commodity transfer system 506 can be configured to be coupled with any receptacle, such as to facilitate the dispensing of a fluid from a receptacle.

Figure 6A:
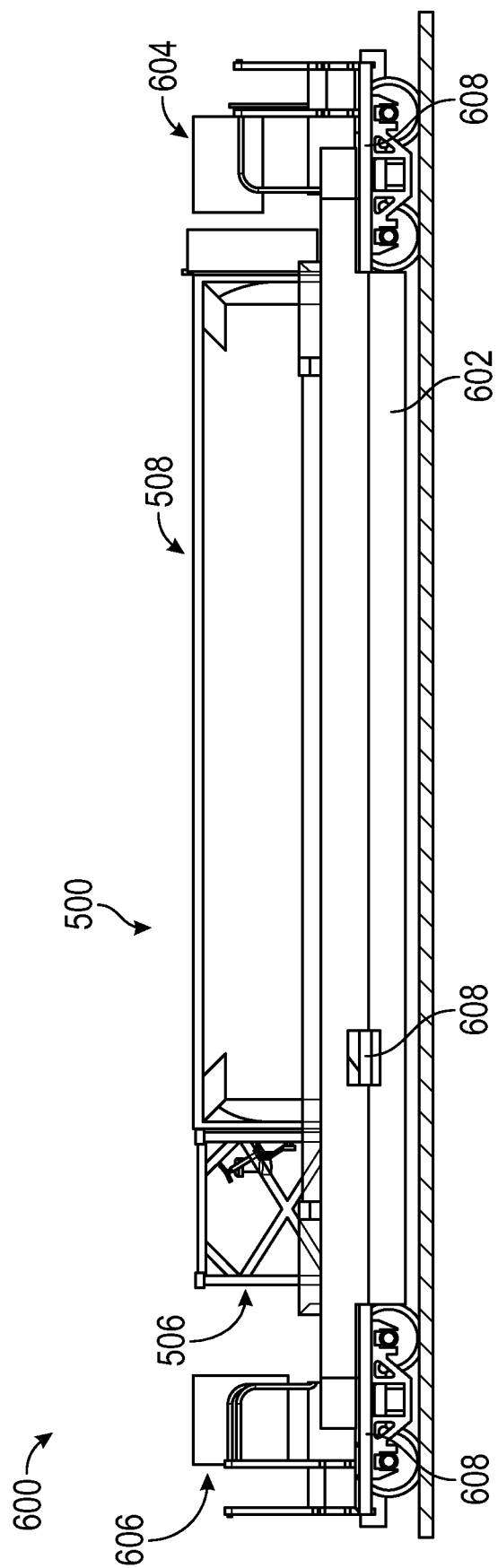
FIG. 6A illustrates a perspective view of an exemplary mobile fluid commodity transfer station, in accordance with one or more exemplary embodiments of the present disclosure.
Figure 6B:
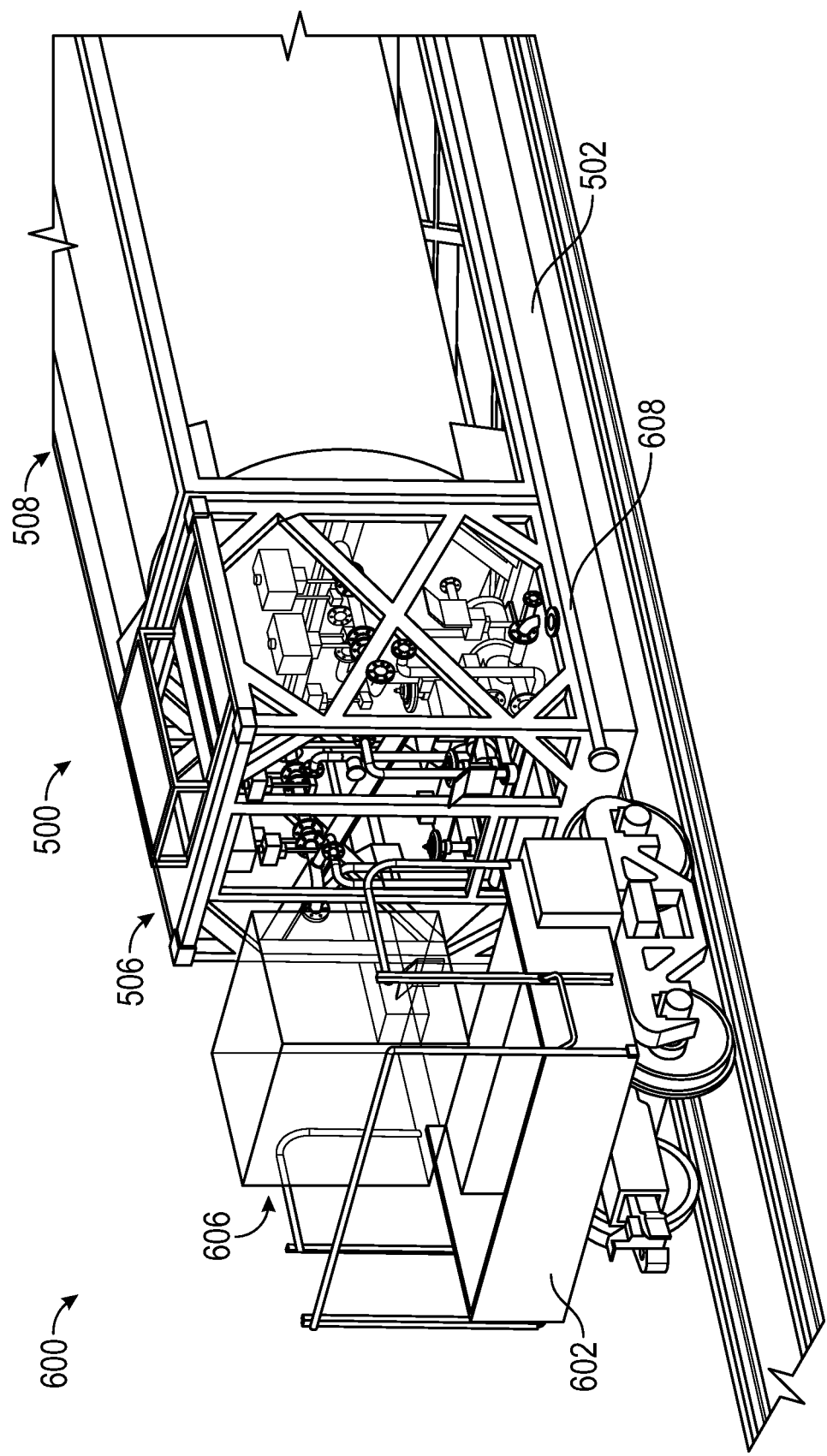
FIG. 6B illustrates a perspective view of the exemplary mobile fluid commodity transfer station depicted in FIG. 6A, in accordance with one or more exemplary embodiments of the present disclosure.

FIGS. 6A-6B depict another embodiment of the present disclosure. FIG. 6A shows a perspective view of a mobile fluid commodity transfer station 600. FIG. 6B depicts a different perspective view of the mobile fluid commodity transfer station 600 through a side of an intermodal transport vehicle 602. In one embodiment, a mobile fluid commodity transfer station 600 can include the fluid commodity transfer structure 500. In another embodiment, the fluid commodity transfer structure 500 can be removably mounted to an intermodal transport vehicle 602. For example, the fluid commodity transfer structure 500 can be mounted to a rail car 602, such as via an intermodal footprint correspondence between an intermodal footprint on the bottom of the base member 502 of the fluid commodity transfer structure 500 and an intermodal footprint on a surface of the rail car 602. In another embodiment, the mobile fluid commodity transfer station 600 can include power and/or air, such as at location 604. For example, the intermodal transport vehicle 602 can include a generator and/or an air compressor thereon, such as can be used to operate a fluid commodity transfer system of the fluid commodity transfer structure 500. In another embodiment, the fluid commodity transfer station 600 can include storage, such as at location 606, wherein additional equipment or components needed for the station 600 can be disposed. In another embodiment, the vehicle 602 can include an air compressor configured to utilize shore power.

In another embodiment, the station 600 can include a conduit 608. In one example, the conduit 608 can be coupled to the intermodal transport vehicle 602. In another embodiment, the conduit can be removably coupled to the intermodal transport vehicle 602. In one example, the conduit 608 can be coupled to the fluid commodity transfer structure 500. In another embodiment, the conduit can be removably coupled to the fluid commodity transfer structure 500. In one embodiment, the conduit 608 can be used to facilitate transportation of fluid from and/or to the fluid commodity transfer structure 500. For example, the receptacle 508 of the fluid commodity transfer structure 500 can be coupled to the conduit 608 (e.g., via the fluid commodity transfer system 506), such that fluid can flow through the conduit 608 to and/or from the receptacle 508. For example, the conduit 608 can extend forward or aft of the rail car 602, such as to another rail car forward or aft of the rail car 602. In this manner, the conduit 608 can coupled to, e.g., a receptacle forward or aft of receptacle 508 of the fluid commodity transfer structure 500, e.g., such that the fluid commodity transfer system 506 can transport fluid to and/or from the other receptacles, as well as receptacle 508. In another embodiment, the conduit 608 can be removed and/or repositioned, such that the conduit 608 can extend any direction from the fueling station 600 in accordance with the principles of the present disclosure, further discussed below.

Figure 7:
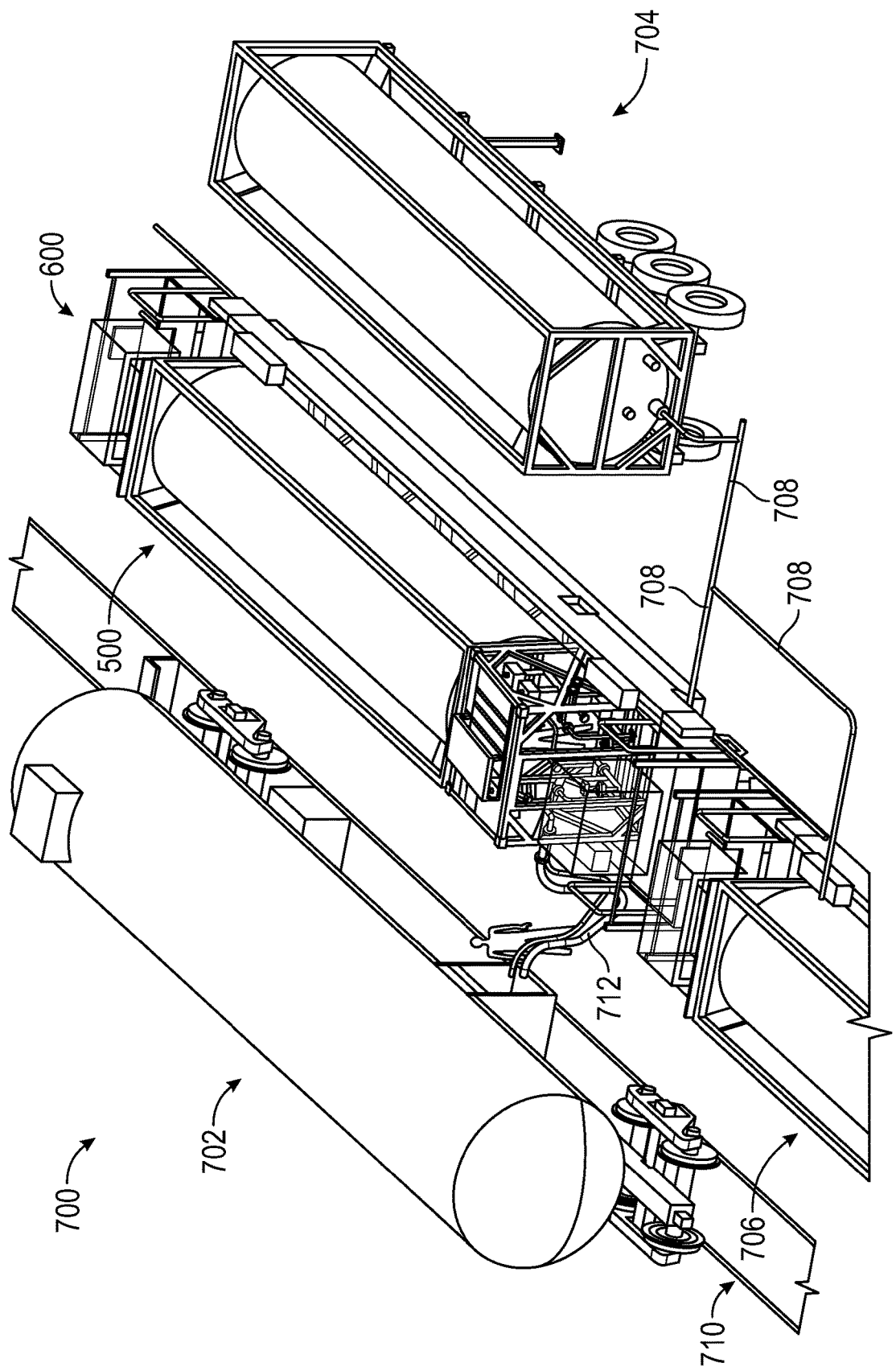
FIG. 7 illustrates an exemplary temporary fluid commodity transfer station, in accordance with one or more exemplary embodiments of the present disclosure.

FIG. 7 depicts another embodiment of the present disclosure. A temporary fluid commodity transfer station 700 can include the mobile fluid commodity transfer station 600. For example, a mobile fluid commodity transfer station 600 can be parked and/or deposited and/or immobilized at a location. In one example, the location can be proximate a thoroughfare 710, such as a road or a track 710 or an oil well. In another embodiment, the station 600 can be operably coupled to one or more receptacles 508, 704, 706, such that the fluid commodity transfer station 600 can dispense fuel stored in the one or more receptacles 508, 704, 706. For example, the fueling station 600 can be operably coupled to a destination, e.g., a fuel tender 702, via a hose 712 or hoses 712 operably coupled to a fluid commodity transfer system of the fluid commodity transfer station 600, and dispense fluid therethrough. In another example, the fueling station 600 can be coupled to receptacles 704, 706 via one or more conduits 708. For example, a conduit 708 can extend and couple to receptacle 704. In another example, a conduit 708 can extend and couple to receptacle 706. In another example, the conduit(s) 708 can coupled to a manifold of a fluid commodity transfer system of the fluid commodity transfer station 600.

Figure 8:
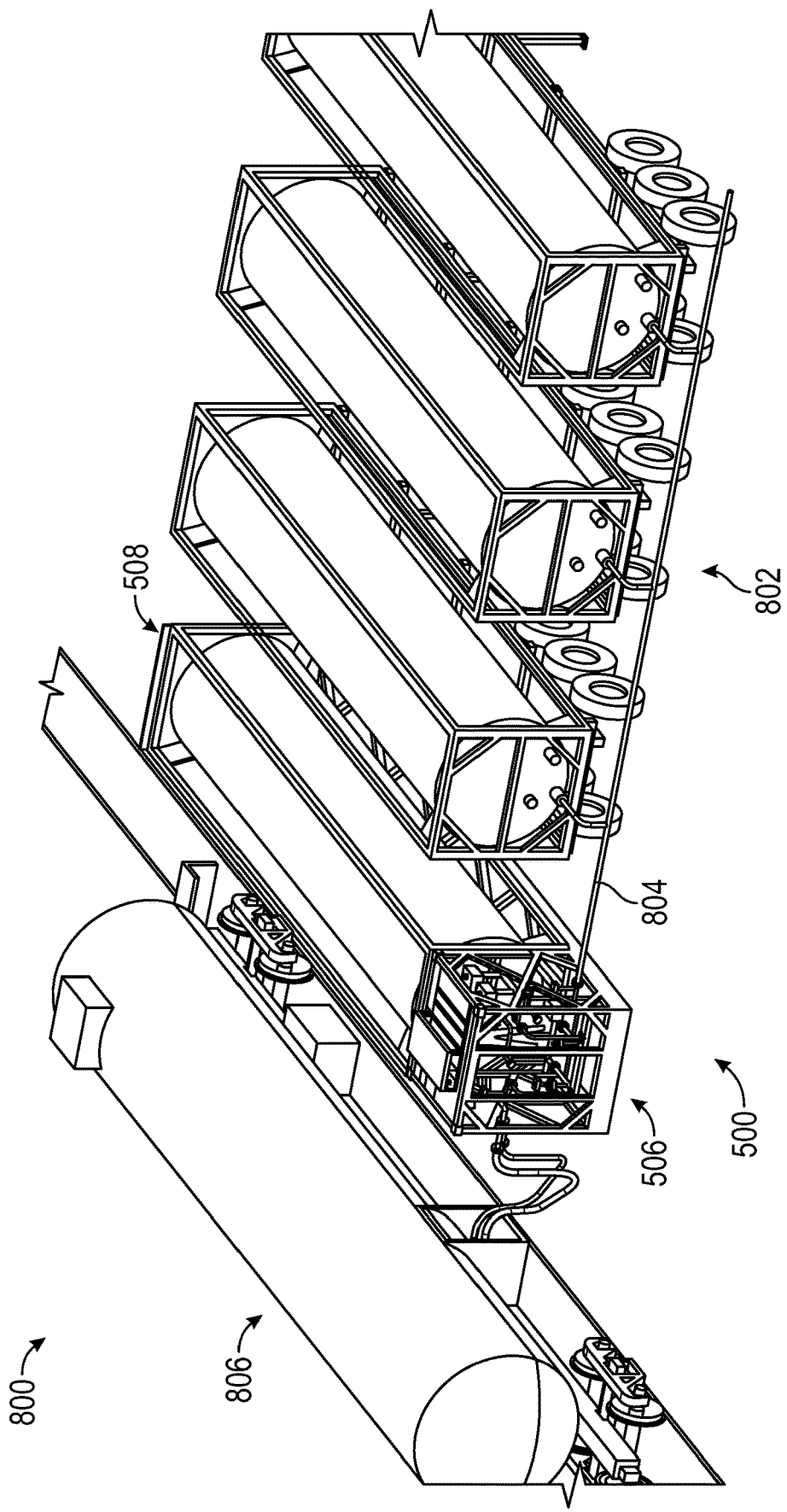
FIG. 8 illustrates an exemplary modular fluid commodity transfer station system, in accordance with one or more exemplary embodiments of the present disclosure.

FIG. 8 depicts another embodiment of the present disclosure. A modular fluid commodity transfer station system 800 can include at least one fluid commodity transfer structure 500. For example, the fluid commodity transfer structure 500 can be transported to a location via an intermodal transport vehicle and unloaded at the location. In another example, the fluid commodity transfer structure 500 can be deposited at a location, such as by, e.g., immobilizing the intermodal transport vehicle with the fluid commodity transfer structure mounted thereon 500, or by placing the fluid commodity transfer structure 500 at the location. In another embodiment, the fluid commodity transfer structure 500 can be operably coupled to one or more receptacles 802, such as via a conduit 804, in accordance with the principles of the present disclosure. For example, the fluid commodity transfer system 506 of the fluid commodity transfer structure 500 can be configured to receive fluid from receptacles 508, 802, and dispense such fluid to a destination, such as, e.g., fuel tender 806. In another embodiment, the fluid commodity transfer structure 500 and/or the receptacles 508, 802 can be operably coupled to a second fluid commodity transfer structure.

Figure 9:
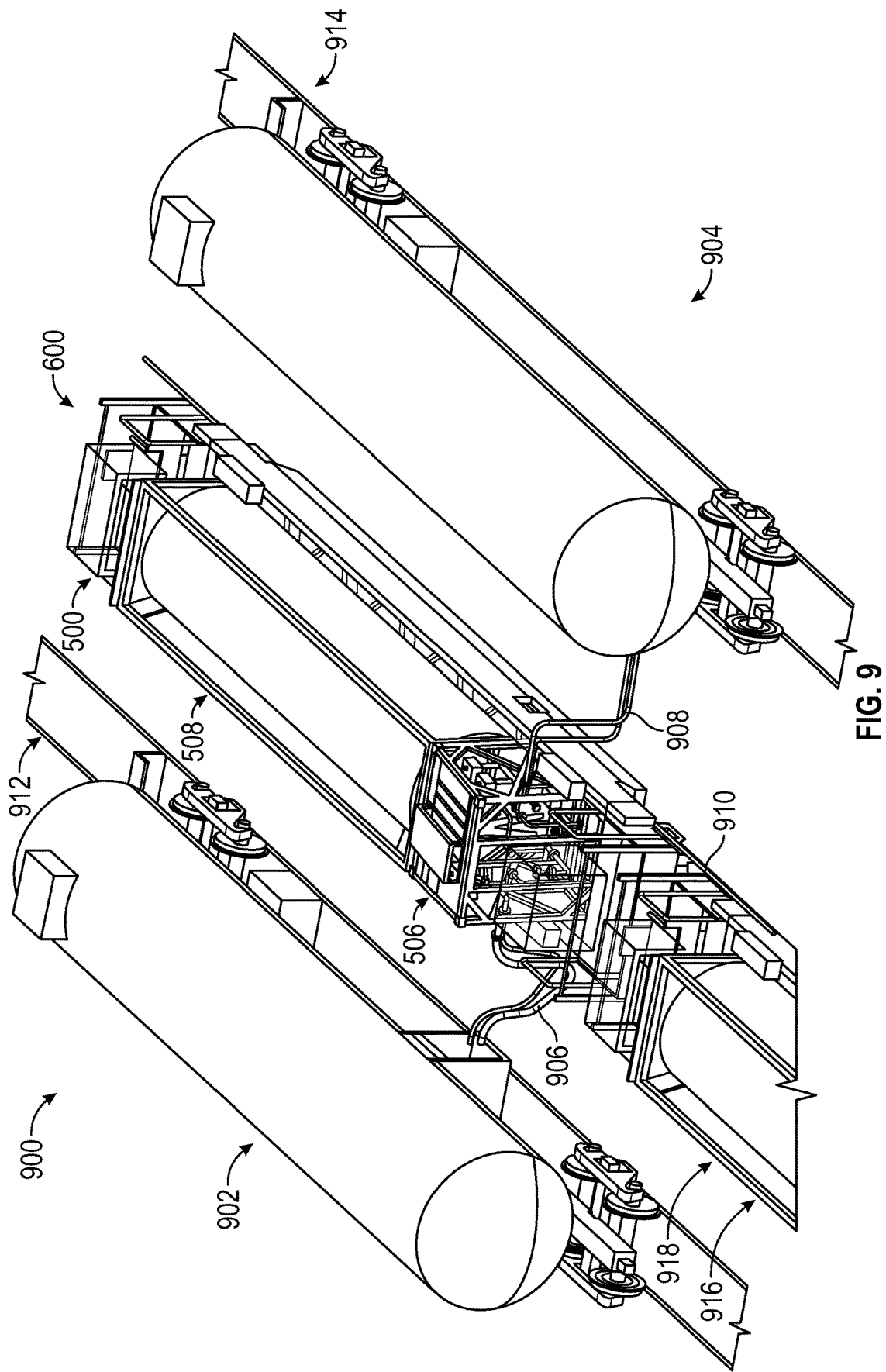
FIG. 9 illustrates an exemplary fluid commodity transfer station, in accordance with one or more exemplary embodiments of the present disclosure.

FIG. 9 depicts another embodiment of the present disclosure. In one embodiment, a fluid commodity transfer station 900 can include a mobile fluid commodity transfer station 600 including a fluid commodity transfer structure 500 in accordance with the principles of the present disclosure. In one embodiment, the station 900 can be configured to provide fluid to two separate destinations. For example, the destinations can be on opposite sides of the mobile fluid commodity transfer station 600. For example, two fluid tenders 902, 904 can be disposed on either side of the station 600, and the fluid commodity transfer structure 500 of the station 600 can operably coupled with one or both tenders 902, 904 to dispense fluid thereto. In one example, a fluid commodity transfer system 506 of the fluid commodity transfer structure 500 can include multiple outlets disposed around the fluid commodity transfer system 506 and/or fluid commodity transfer structure 500 (similar to, e.g., fluid commodity transfer system 400 of FIG. 4). In another example, hoses (hose assemblies) 906, 908 can be coupled to the fluid commodity transfer structure 500 (such as via the outlets) and thereby dispense fluid. In another embodiment, the mobile fluid commodity transfer station 600 (and/or fluid commodity transfer station 900) can include a second fluid commodity transfer structure 916, such as can be disposed forward or aft of fluid commodity transfer structure 500. In one example, the receptacles 508, 918 of the fluid commodity transfer structures 500, 916 can be operably coupled to one another, such as via conduit 910. In one example, a fluid commodity transfer system of either fluid commodity transfer structure 500, 916 can access the receptacles 508, 918 of either fluid commodity transfer structure 500, 916. In another embodiment, the mobile fluid commodity transfer station 600 can be disposed between two thoroughfares 912, 914, such as, e.g., two railroad tracks 912, 914. In another embodiment, the fluid commodity transfer structure(s) 500, 916 can facilitate the dispensing of fluid to destinations on the thoroughfares 912, 914.

Figure 10:
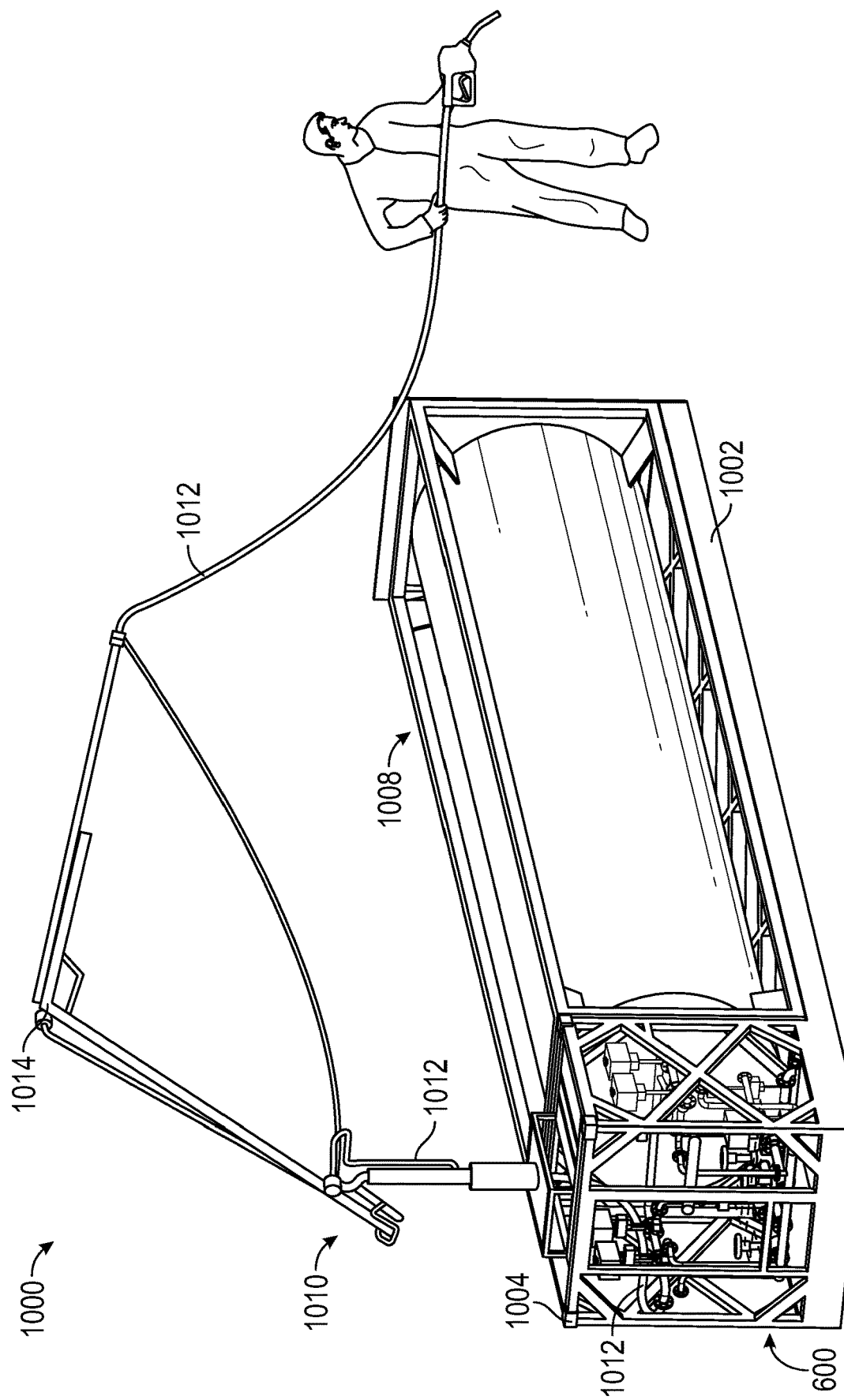
FIG. 10 illustrates an exemplary fluid commodity transfer apparatus, in accordance with one or more exemplary embodiments of the present disclosure.

FIG. 10 depicts another embodiment of the present disclosure. A fluid commodity transfer apparatus (fluid commodity transfer structure) 1000 can include a base member 1002 in accordance with the principles of the present disclosure. In one example, the base member 1002 can facilitate the removable disposal of a receptacle 1008 on a top side of the base member 1002, and can further facilitate the removable disposal of the apparatus 1000 on, e.g., an intermodal transport vehicle, such as via a bottom side of the base member 1002. In another example, the base member 1002 can include one or more intermodal footprints on the top side and/or the bottom side. In another embodiment, the apparatus 1000 can further include a casing 1004 in accordance with the principles of the present disclosure. In another embodiment, the apparatus 1000 can further include a fluid commodity transfer system 1006, which, in one embodiment, can be disposed within the casing 1004.

In another embodiment, the apparatus 1000 can include a fluid boom (boom) (boom arm) 1010 operably coupled to the apparatus 1000. In one example, the boom 1010 can be operably coupled to the casing 1004; in another example, the boom can be operably coupled to the receptacle 1008. In another example, the boom 1010 can be operably coupled to, e.g., an intermodal transport vehicle on which the base member 1002 sits. In another embodiment, the boom 1010 can be coupled in any manner suitable to facilitate dispensing of fluid via the boom to one or more destinations. For example, the boom 1010 can include an arm 1014 that can be coupled to the casing 1004, receptacle 1008, base member 1002, and/or intermodal transport vehicle. In one example, the arm 1014 can be automated. For example, the arm 1014 can be configured to be remote controlled. In another example, the arm 1014 can be manually operated, such that personnel can utilize the arm 1014 to facilitate the dispensing of fluid. In another embodiment, the boom 1010 can include a hose 1012 or hoses 1012 that can be coupled to the fluid commodity transfer system 1006 and extend through the boom 1010, such as to facilitate the dispensing of fluid via the boom.

In one embodiment, the principles of the present disclosure can include the operable coupling of one or more fluid commodity transfer structures together with one or more receptacles to facilitate establishment of a pop-up fluid commodity transfer station that can vary in size as needed. In another embodiment, the fluid commodity transfer systems disclosed herein can be configured to dispense fluid automatically. For example, the fluid commodity transfer systems can be in operable communication with one or more sensors, such as to sense a fluid level in a fluid tender. In another example, the fluid commodity transfer systems can be in operable communication with one or more controllers that can be configured to receive data from the one or more sensors and utilize such data to determine a duration of dispensing or an amount of overall fluid to dispense. For example, actuated valves can be operated by an electronic control unit. In another example, a user of the system can make connection and initiate an automatic liquid transfer event, and a controller can notify a user when connections should be removed. In another example, automatic liquid transfer can make use of lading level measurements on board, e.g., a fluid tender, to determine how much fluid is needed.

In another embodiment, the fluid commodity transfer systems can dispense fluid at particular rates. For example, a fluid commodity transfer system in accordance with the principles of the present disclosure can be configured to dispense fluid at 300 gallons per minute or more. In another example, a fluid commodity transfer system can be configured to dispense fluid at around 150 gallons per minute. In another embodiment, a fluid commodity transfer system in accordance with the principles of the present disclosure can be configured to utilize shore power and/or shore air (e.g., power and/or air that is not generated on-board an intermodal transport vehicle). In another example, a fluid commodity transfer system in accordance with the principles of the present disclosure can be configured to utilize power and/or air generated on-board an intermodal transport vehicle. In another embodiment, a fluid commodity transfer system in accordance with the principles of the present disclosure can be configured to utilize power and/or air generated on a fluid commodity transfer structure.

The present disclosure achieves at least the following advantages:

1. Pop-up fluid commodity transfer stations that can be picked up and moved as needed;
2. Modular fluid commodity transfer structures that can be configured for intermodal transport to enable fluid dispensing without constructing a permanent fluid commodity transfer station;
3. Enabling the establishment of temporary fluid commodity transfer stations or commercial transfer points;
4. Enabling dispensing of fluid to two separate fluid tenders or railcars on two separate tracks via one fluid commodity transfer structure, or the dispensing of fluid to on-road highway trailers from railcars via the same fluid commodity transfer structure;
5. Fluid dual-dispensing via a fluid commodity transfer structure capable of dispensing fluid from both sides of the fluid commodity transfer structure;
6. Providing a temporary fluid commodity transfer station system which can be easily restocked as needed, such as by replacing empty receptacles with full receptacles, and coupling the full receptacles to fluid commodity transfer structures;
7. Allowing for modular fluid commodity transfer systems that can maximize a fluid reservoir by coupling singular fluid commodity transfer structures to multiple receptacles and/or to each other;
8. Modulating fluid dispensing via fluid commodity transfer structure with two intermodal footprints, such that receptacles can be exchanged on the structure, and the structure itself can be exchanged amongst intermodal transport vehicles;

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Particularly, a fluid commodity transfer system is not intended to invoke 35 U.S.C. § 112(f), as shown in at least FIGS. 3 and 4, and its corresponding written description.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A fluid commodity transfer structure comprising:
   a base member having a top surface, a bottom surface, and at least one intermodal footprint, the base member configured for intermodal transport, wherein the top surface of the base member is configured to receive at least one receptacle disposed on the top side of the base member;
   a casing coupled to the top surface at a first end of the base member and abutting the at least one intermodal footprint, wherein the casing and the top surface of the base member are of a unitary construction forming a single structure;
   a fluid commodity transfer system disposed on the top surface of the base member within the casing, the fluid commodity transfer system comprising:
   a first side comprising a first outlet, a first inlet, and a first pump;
   a second side that is opposite the first side, the second side comprising a second outlet, a second inlet, and a second pump; and a third side comprising a third inlet, the third side facing the at least one receptacle;
a barrier member coupled to a distal end of the base member opposite from the casing, the barrier member configured to:
abut the at least one receptacle; and
secure the at least one receptacle to the base member between the barrier member and the casing; and
a conduit configured to operably couple the fluid commodity transfer system to the at least one receptacle, wherein the conduit is configured to couple the fluid commodity transfer system to a receptacle of another fluid commodity transfer structure to facilitate the fluid commodity transfer system transporting fluid to or from the receptacle of the another fluid commodity transfer structure.

2. The structure of claim 1, wherein the top surface of the base member includes a first intermodal footprint.

3. The structure of claim 2, wherein the casing and the fluid commodity transfer system abut the first intermodal footprint.

4. The structure of claim 2, wherein the first intermodal footprint of the base member is capable of receiving the at least one receptacle.

5. The structure of claim 1, wherein the bottom surface of the base member includes a second intermodal footprint.

6. The structure of claim 5, wherein the second intermodal footprint is configured to facilitate placement of the structure on an intermodal transport vehicle.

7. The structure of claim 1, further comprising a first receptacle removably disposed on the top surface of the base member and operably coupled to the system.

8. The structure of claim 1, wherein the conduit is removably coupled to the base member.

9. The structure of claim 7, wherein the first receptacle includes a tank and a frame.

10. The structure of claim 1, further comprising a boom operably coupled to the fluid commodity transfer structure and configured to dispense a fluid from at least one receptacle.

11. A method of establishing a temporary fueling station, the method comprising the steps of:
deploying a fluid commodity transfer structure at a location, the fluid commodity transfer structure including a base member, a casing coupled to a top surface at a first end of the base member, a fluid commodity transfer system disposed within the casing, a first receptacle disposed on the top surface of the base member and abutting the casing and the fluid commodity transfer system, and a barrier member coupled to a distal end of the base member opposite from the casing, the barrier member configured to abut the first receptacle and secure the first receptacle to the base member between the barrier member and the casing, wherein the casing and the top surface of the member are of a unitary construction forming a single structure, and wherein the fluid commodity transfer system comprises:
a first side comprising a first outlet, a first inlet, and a first pump;
a second side that is opposite the first side, the second side comprising a second outlet, a second inlet, and a second pump; and
a third side comprising a third inlet, the third side facing the first receptacle;
coupling at least one other receptacle to the fluid commodity transfer structure via a conduit, wherein the conduit is configured to couple the fluid commodity transfer structure to the at least one other receptacle to facilitate the fluid commodity transfer system transporting fluid to or from the at least one other receptacle; and
dispensing, via the system, a commodity from at least one of the first receptacle or the at least one other receptacle,
wherein the base member includes at least one intermodal footprint, the base member configured for intermodal transport, and
wherein the casing abuts the at least one intermodal footprint.

12. The method of claim 11, wherein the location is proximate a railway and a roadway to allow product transfer between different modes of transportation.

13. The method of claim 11, wherein the commodity is dispensed to a tender of a train.

14. The method of claim 11, wherein the commodity is dispensed into a rail car for transportation.

15. The method of claim 11, wherein the location is between two railroad tracks.

16. The method of claim 11, further comprising the step of unloading the fluid commodity transfer structure from a vehicle.

17. The method of claim 11, wherein the fluid commodity transfer structure is removably coupled to a rail car, fuel tender, or on-road transport trailer.

18. A modular fueling station system, the system comprising:
a first fluid commodity transfer structure including:
a base member having a top surface, a bottom surface, and at least one intermodal footprint, the base member configured for intermodal transport;
a fluid commodity transfer system disposed within a casing coupled to the top surface at a first end of the base member, wherein the casing and the top surface of the member are of a unitary construction forming a single structure, the fluid commodity transfer system comprising:
a first side comprising a first outlet, a first inlet, and a first pump; and
a second side that is opposite the first side, the second side comprising a second outlet, a second inlet, and a second pump; and
a barrier member coupled to a distal end of the base member opposite from the casing, the barrier member configured to:
abut a first receptacle; and
secure the first receptacle to the base member between the barrier member and the casing;
the first receptacle removably disposed on the top surface of the base member and operably coupled to the fluid commodity transfer system; and
a second fluid commodity transfer structure including a second receptacle, wherein the first fluid commodity transfer structure includes a conduit configured to operably couple the fluid commodity transfer system to the first receptacle, wherein the conduit is configured to couple the fluid commodity transfer system to the second receptacle of the second fluid commodity transfer structure to facilitate the fluid commodity transfer system transporting fluid to or from the second receptacle of the second fluid commodity transfer structure.

19. The system of claim 18, further including a plurality of additional receptacles.

20. The system of claim 18, wherein the second receptacle is removably disposed on the second fluid commodity transfer structure.

21. The system of claim 18, wherein the second receptacle is operably coupled to a second fluid commodity transfer system of the second fluid commodity transfer structure.

22. The system of claim 18, wherein the second receptacle is operably coupled to the system of the first structure.

23. The system of claim 22, further comprising a third receptacle is operably coupled to the fluid commodity transfer system of the first fluid commodity transfer structure.

24. A modular fluid commodity transfer system, the system comprising:
a first transfer structure including:
a base member having a top surface, a bottom surface, and at least one intermodal footprint, the base member configured for intermodal transport;
a dispensing system disposed within a casing coupled to the top surface at a first end of the base member, wherein the casing and the top surface of the base member are of a unitary construction forming a single structure, the dispensing system comprising:
a first side comprising a first outlet, a first inlet, and a first pump; and
a second side that is opposite the first side, the second side comprising a second outlet, a second inlet, and a second pump; and
a barrier member coupled to a distal end of the base member opposite from the casing, the barrier member configured to:
abut a first receptacle; and
secure the first receptacle to the base member between the barrier member and the casing;
the first receptacle removably disposed on the top surface of the base member and operably coupled to the transfer system; and
a second receptacle of a second transfer structure; and
a conduit configured to operably couple the dispensing system to the first receptacle, wherein the conduit is configured to couple the dispensing system to the second receptacle of the second transfer structure to facilitate the dispensing system transporting fluid to or from the second receptacle of the second transfer structure,
wherein the modular fluid commodity transfer system facilitates the transfer of a commodity between a road vehicle and a railcar.

25. The system of claim 24, wherein the structure is placed proximate a railway and a roadway to allow commodity transfer between different modes of transportation.

26. The fluid commodity transfer structure of claim 1, the fluid commodity transfer system further comprising a plurality of valves actuated by an electronic control unit, wherein the electronic control unit is configured to notify a user when to remove one or more connections after the user initiates an automated fueling event.

\* \* \* \* \*